United States Patent [19]
Matsui et al.

[11] Patent Number: 5,761,482
[45] Date of Patent: Jun. 2, 1998

[54] EMULATION APPARATUS

[75] Inventors: Hideo Matsui; Masahiko Ikemoto, both of Hyogo, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 463,414

[22] Filed: Jun. 5, 1995

[30] Foreign Application Priority Data

Dec. 19, 1994 [JP] Japan ................... 6-314767

[51] Int. Cl.$^6$ .................... G06F 9/46; G06F 9/44
[52] U.S. Cl. ................ 395/500; 395/733; 395/734; 395/739
[58] Field of Search ................... 395/500, 375, 395/183.04, 733, 734, 739, 740, 737, 738; 364/900

[56] References Cited

U.S. PATENT DOCUMENTS 4,674,089  6/1987  Poret et al. ................ 395/183.04
4,847,805  7/1989  Ishii et al. .................... 364/900
4,875,186  10/1989  Blume, Jr. ................... 364/900
5,321,828  6/1994  Phillips et al. ............... 395/500
5,408,637  4/1995  Shimizu ....................... 395/500
5,493,659  2/1996  Kurakazu et al. ............ 395/375
5,539,901  7/1996  Ramirez ...................... 395/500

*Primary Examiner*—Emanuel Todd Voeltz
*Assistant Examiner*—Vuthe Siek
*Attorney, Agent, or Firm*—McDermott, Will & Emery

[57] ABSTRACT

An access condition coincidence detecting circuit detects that an address stored in an access condition storing register 44 is outputted to an address bus 29. When a counter 46 counts a certain number of detecting signals, it inputs a break point signal to an AND circuit 36. On the other hand, it is detected that an address stored in a break address storing register 34 is outputted to the address bus 29. When the break point signal is inputted to the AND circuit 36, this detecting signal is outputted from the AND circuit 36 as an interruption demand signal. Such a construction provides an emulation apparatus capable of securely controlling interruption of a program under complicated address coincidence conditions in an emulating operation of a microcomputer.

54 Claims, 7 Drawing Sheets

EMULATION APPARATUS

BACKGROUND OF THE INVENTION

1. Field of the Invention

This invention relates to an emulation apparatus for carrying out an emulating operation in order to develop software of a single chip microcomputer, particularly to an emulation apparatus for controlling interruption of a program executed by a microcomputer at the time of an emulating operation.

2. Description of the Prior Art

In a microcomputer, an emulating operation is required to remove errors (hereinafter referred to as bugS)in a program by correcting program codes which are to be written in a read only memory (hereinafter referred to as ROM) stored in the microcomputer. In this emulating operation, programs to be actually stored in the microcomputer are successively given as programs, which are objects to be emulated, from the outside of the microcomputer, and the programs to be emulated are then executed by the microcomputer. When necessary, an operation of a program is stopped in order to monitor the inside status of the microcomputer, and instead, an emulating program is executed as an interruption processing, thereby developing the program to be stored in the microcomputer.

For example, FIG. 1 is a circuit construction diagram showing a conventional emulation apparatus for carrying out an emulating operation. In this drawing, reference numeral 1 denotes a microcomputer consisting of a single chip; 2 a central processing unit (hereinafter referred to as a CPU) for controlling operation of the entire microcomputer 1 and executing calculation processing; 3 an interruption controlling unit (hereinafter referred to as an ICU) for controlling interruption demands to stop program operation; 4 a random access memory (hereinafter referred to as a RAM) for storing therein reference data, processing data and instruction codes at the time of executing instructions. Furthermore, the microcomputer 1 includes various functional circuits and registers for these functions as well as the CPU 2, the IPU 3 and the RAM 4. Reference numeral 5 denotes a program counter, included in the CPU 2, for generating address signals which respectively designate functional circuits; and 6 a status signal generating circuit, included in the CPU 2, for generating a status signal which shows the operation status of the CPU 2.

Reference numeral 7 denotes an emulator for controlling an emulating operation of the microcomputer 1. The emulator 7 gives a program to be emulated to the microcomputer 1, and traces and monitors the status of the microcomputer 1 which has executed the program. In this emulator 7, reference numeral 8 denotes a program memory for storing a program to be emulated and outputting it to the microcomputer 1; 9 a trace memory for tracing an execution sequence of the microcomputer 1 which executes this emulated program; 10 a condition determining circuit for determining a condition as to whether an interruption is to be executed by the program to be emulated.

Furthermore, reference numeral 11 denotes an address bus; 12 a data bus for exchanging data between the emulator 7 and each of functional circuits such as the CPU 2, ICU 3 and RAM 4; 13 an output signal line for a status signal from the status signal generating circuit 6; 14 a software break signal (hereinafter referred to as an S. BRK) generated by decoding a break instruction in the CPU 2, which break instruction is a software interruption instruction at the time of an emulating operation; 15 a break interruption signal (hereinafter referred to as a BRK) which stops a program being executed (hereinafter referred to as executed program) for controlling the CPU 2 upon receiving an S. BRK 14 and then demands an execution of an emulating program which is different from the executed program.

Next, operation of an emulation apparatus as shown in FIG. 1 will be described.

A program to be emulated is previously written in the program memory 8. The CPU 2 outputs an address "n" designating an instruction code "Xn" in this program to be emulated to the address bus 11 by using the program counter 5. The program memory 8 receives the address "n" and a status signal which is supplied from the status signal generating circuit 6, and outputs the instruction code "Xn" to the microcomputer 1 via the data bus 12. The CPU 2 decodes this instruction code to execute the instruction.

On the other hand, signals on the address bus 11, status signal line 13 and data bus 12 are simultaneously inputted to the condition determining circuit 10. The condition determining circuit 10 previously stores a certain emulation address as a break condition. When each data and signals on the address bus 11, the status signal line 13, and the data bus 12 coincides with a corresponding emulation address stored in the condition determining circuit 10, the condition determining circuit 10 outputs a break point signal to the program memory 8.

A case will be described where a program to be emulated is stopped immediately before executing an instruction code "Xn" and instead an emulating program is started. An address "n" designating an instruction code "Xn" is previously stored as a break condition in the condition determining circuit 10. When an address signal in the address bus 11 coincides with the stored address "n", the condition determining circuit 10 outputs a break point signal. In response to this break point signal, the program memory 8 outputs a break instruction code instead of outputting the instruction code "Xn", and transmits the break instruction code via the data bus 12 to the microcomputer 1.

The CPU 2 decodes this break instruction code to generate an S. BRK signal 14. The signal 14 is inputted to the ICU 3. The ICU 3 outputs a BRK signal to cause the CPU 2 to generate a vector address in response to an interruption demand factor corresponding to the above break instruction code and to write a certain vector address in the program counter 5. This vector address starts an emulating program (which may be also called as a monitor program) previously stored in the program memory 8 as a break interruption subroutine. By this emulating program, the contents in each register (not shown) and the RAM 4 included in the microcomputer 1 just before executing the instruction code "Xn" are incorporated in the trace memory 9. The incorporated contents are monitored, thereby performing an emulating operation.

According to the above conventional emulation apparatus, an address signal 11 is simultaneously inputted to the condition determining circuit 10 and program memory 8 in the emulator 7. In the program memory 8, it takes a time to replace the instruction code "Xn" with a break instruction code. Thus, even if a break point signal generated from the condition determining circuit 10 is inputted to the program memory 8, a break instruction code is not immediately outputted from the program memory 8. As a result, a break instruction code may be outputted after the instruction code "Xn" has been undesirably outputted. Consequently, there is a problem in that since the instruction code "Xn" is executed in the microcomputer 1, interruption control cannot be executed at a desirable break point.

Even if the instruction code "Xn" is erroneously transmitted to the microcomputer 1 before a break instruction code is transmitted, there is no problem as long as the break instruction code is transmitted to the CPU 2 at a time when the interruption control can be performed before executing the instruction code "Xn" in the CPU 2. However, in a microcomputer operated in response to operation clocks whose maximum operating frequency is 10 MHz or more as its specification, input of a break instruction code to the microcomputer is delayed due to the capacity of wirings between the microcomputer and the emulator. Thus, interruption processings are often carried out after executing the instruction code "Xn".

Particularly, other than the emulating operation by a single address, in case where a subroutine program is executed plural times in a program to be emulated, the inside status of a microcomputer is required to be confirmed under complicated break conditions. For example, when a break condition requires plural coincidences of address signals with the above address "n", a counter for counting the plural coincidences is necessary in the condition determining circuit 10. As a result, a problem arises in that a break point signal is outputted at more undesirable timing by the delay due to the counting operation so that the output of a break instruction code is further delayed.

Summary of the Invention

The invention has been attained to solve the above problems, and has an object to provide an emulation apparatus capable of executing correct interruption control at a beak point even in an emulating operation of a microcomputer operated at a high frequency in case where a program break is performed by detecting plural coincidences in an address as mentioned above.

According to the first aspect of the invention, there is provided an emulation apparatus provided with a microcomputer and an emulator: the microcomputer comprising: central processing means for outputting an address signal to execute a program; break condition coincidence detecting means for storing a break address indicating a break condition, and for outputting a coincidence detecting signal when the address signal coincides with the break address; break allowance determining means for determining whether the coincidence detecting signal is valid or invalid; and break controlling means for receiving the coincidence detecting signal when the break allowance determining means determines that the coincidence detecting signal is valid and controlling the central processing means to stop execution of the program; the emulator comprising: access condition determining means for storing an access condition address to access the break condition, monitoring the address signals, and outputting a break allowance signal to the break allowance determining means when a coincidence of the address signal with the access condition address is detected; wherein when the break allowance signal is inputted to the break allowance determining means, the break allowance determining means determines that the coincidence detecting signal is valid.

The access condition determining means preferably outputs the break allowance signal, when the address signal coincides with the access condition address plural times.

The above access condition determining means preferably comprises: an access condition storing register for storing the access condition address; a condition coincidence detecting circuit for outputting a condition coincidence signal when the address signal coincides with the access condition address; and a counter for outputting the break allowance signal when the condition coincidence signal is counted plural times.

An emulator of an emulation apparatus according to the second aspect of the invention comprises: first access condition determining means for storing a first access condition address to access a break condition, monitoring the address signals, and outputting a first coincidence signal when a coincidence of an address signal with the first access condition address is detected; second access condition determining means for storing a second access condition address to access the break condition, monitoring the address signals, and outputting a second coincidence signal when a coincidence of an address signal with the second access condition address is detected; and a logical circuit for outputting a break allowance signal when the first and second coincidence signals are detected; wherein when the break allowance signal is inputted to break allowance determining means, the break allowance determining means determines that a coincidence detecting signal is valid.

The above first and second access condition determining means preferably detect that an address signal coincides with at least one of the first and second access condition addresses plural times.

Preferably, the break address in the emulation apparatuses of the first and second aspects is an address designating an instruction code in the program, and when the break allowance determining means determines that the coincidence detecting signal is valid, the break controlling means controls the central processing means such that the central processing means does not execute the instruction code.

The break address in the emulation apparatuses of the first and second aspects may be an address designating a site from which data is read or to which data is written, and when the break allowance determining means determines that the coincidence detecting signal is valid and data is read from or written to the site designated by the break address, the break controlling means stops processing of the central processing means.

Preferably, the break condition coincidence detecting means in the above emulation apparatuses of the first and second aspects stores the break address indicating a break condition and a data value; and when an address signal coincides with the break address and a data signal coincides with the data value, the break address condition detecting means outputs the coincidence detecting signal; and when the break allowance determining means determines that the coincidence detecting signal is valid and this data value is read from or written to a site designated by the break address, the break controlling means stops processing of the central processing means.

The access condition address in the emulation apparatuses of the first and second aspects is an address designating an instruction code in a program and second or third address is an address designating a site from which data is read or to which data is written.

The access condition determining means in the emulation apparatus of the first and second aspects has data storing means for storing a second data value, and detects that an address signal coincides with the access condition address designating a site from which the second data value is read or to which the second data value is written and that a data signal outputted to a data bus transmitting data coincides with the second data value.

In the emulation apparatus of the first aspect thus constructed; in case where when the central processing means outputs an access condition address and then an address signal outputted therefrom coincides with a break address, an interruption is effected; a coincidence with the break address as a break condition is detected on the microcomputer side, while a coincidence with the access condition address to access the break condition is detected on the emulator side. The break allowance determining means determines when a coincidence detecting signal with the break address is valid by recognizing the coincidence detecting signal with the access condition address as a break allowance signal, thereby controlling interruption. Thus, the coincidence detecting signal with the break address is generated inside the microcomputer, which coincidence detecting signal as it is allows interruption of a program without delay as a break demand signal.

Since the access condition determining means outputs a break point signal when an address signal coincides with an access condition address plural times, interruption is done when the same address signal as the access condition address is outputted from the central processing means certain plural times and thereafter a break address is outputted. At this time, a coincidence detecting signal with the break address is generated inside the microcomputer, which coincidence detecting signal as it is allows interruption of a program without delay as a break demand signal.

Since the emulator of the second aspect is provided with the first access condition determining means for outputting the first coincidence signal when a coincidence of an address signal with the first access condition address is detected; the second access condition determining means for outputting the second coincidence signal when a coincidence of an address signal with the second access condition address is detected; and the logical circuit for outputting a break allowance signal to the break allowance determining means when the first and second coincidence signals are detected: an interruption is effected when the same address signals as the first and second access condition addresses are outputted from the central processing means and then an address signal therefrom coincides with a break address. At this time, the first coincidence detecting signal is generated inside the microcomputer, which coincidence detecting signal as it is allows the interruption of a program without delay as a break demand signal.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

Embodiment 1

Figure 1:
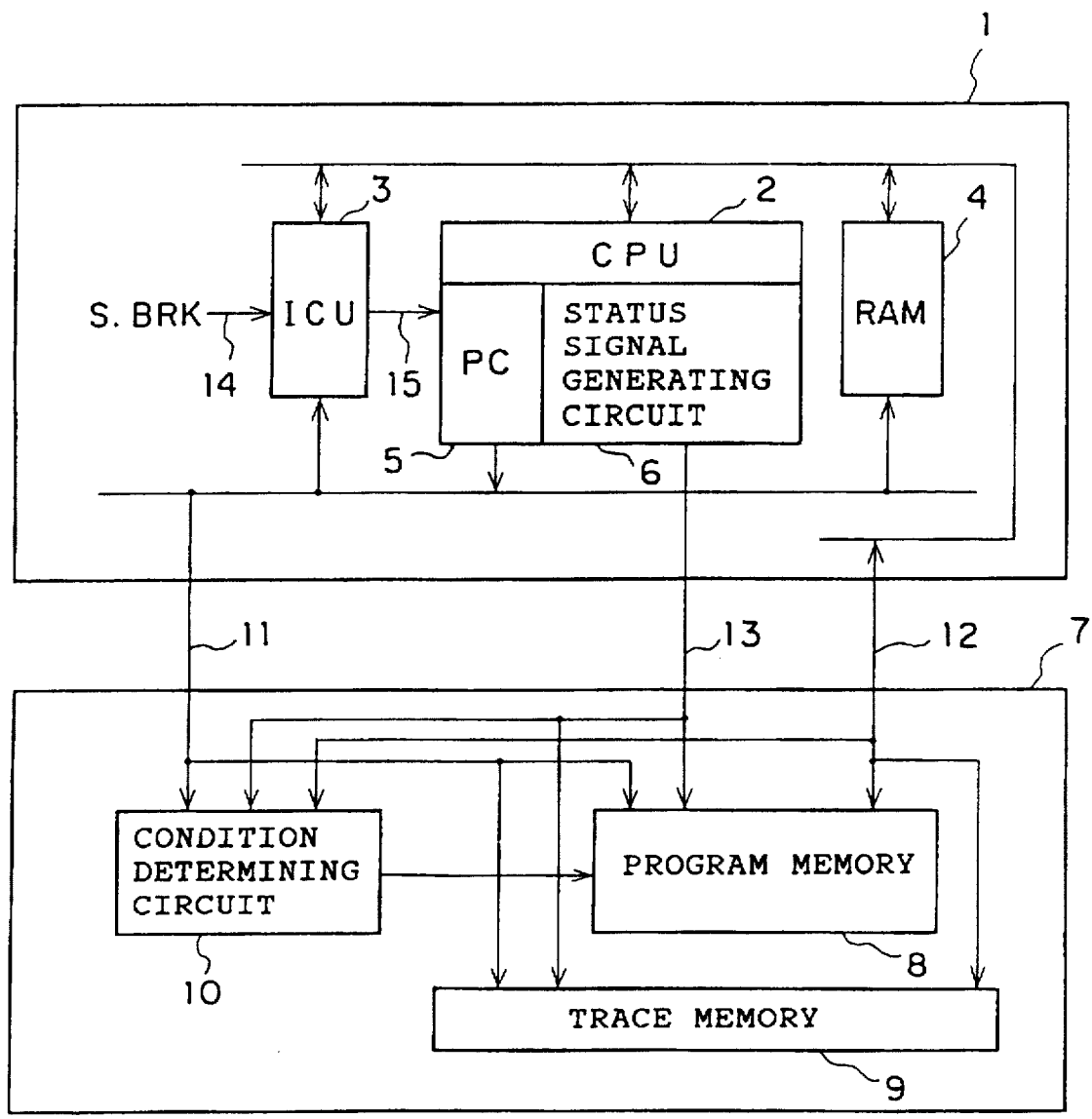
FIG. 1 is a circuit construction diagram showing a conventional emulation apparatus.
Figure 2:
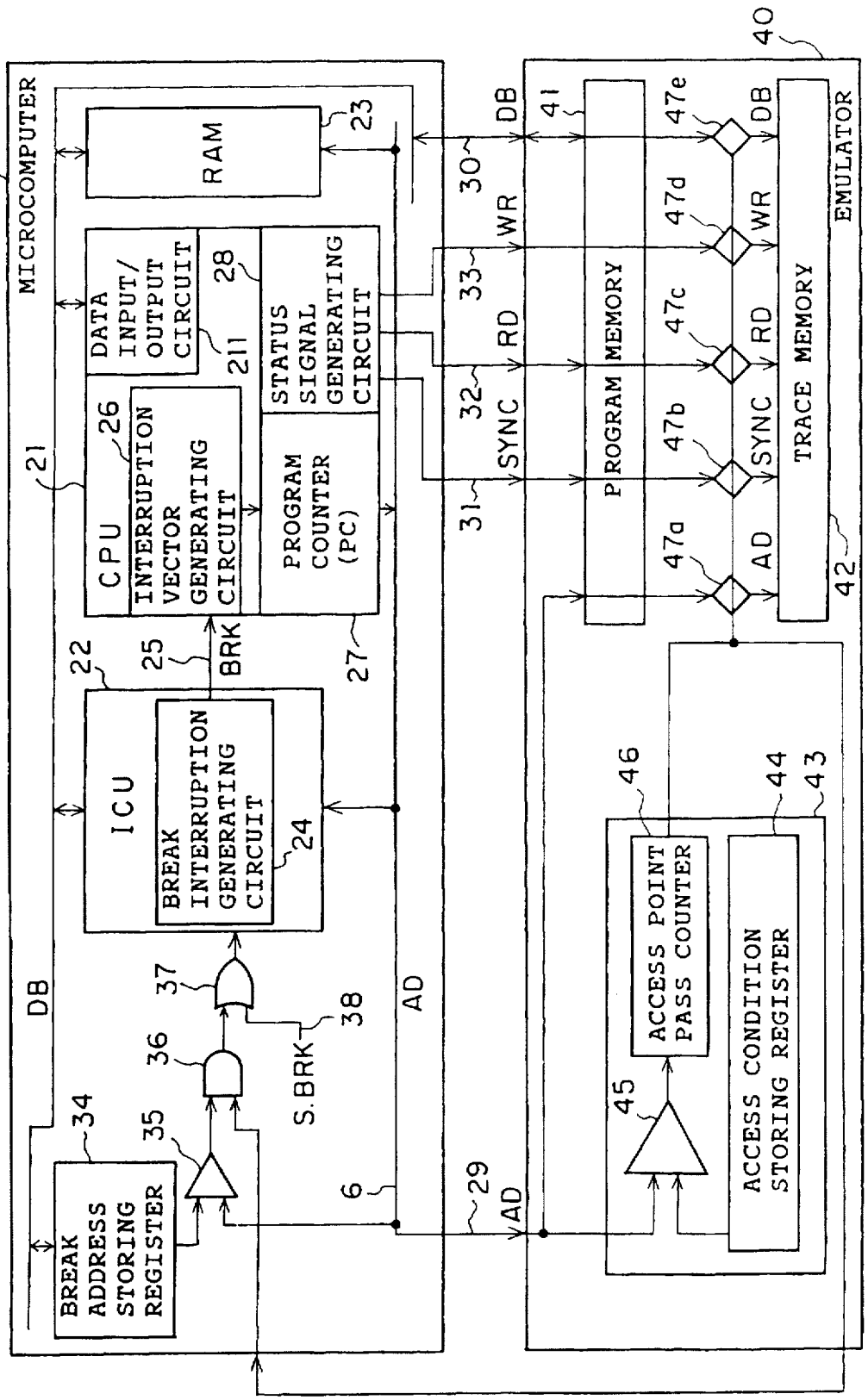
FIG. 2 is a circuit construction diagram showing an emulation apparatus in accordance with Embodiment 1 of the invention.

One embodiment of the invention will be described. FIG. 2 is a circuit diagram of an emulation apparatus constructed at the time of emulation in this embodiment. In this drawing, reference numeral 20 denotes a microcomputer storing therein a program which is an object to be emulated; 40 an emulator for executing and controlling emulation of the microcomputer 20. The microcomputer 20 is connected with the emulator 40 via various signal lines to constitute an emulation apparatus.

In the microcomputer 20, reference numeral 21 denotes a central processing unit (hereinafter referred to as a CPU) for controlling the operation of the microcomputer to execute a calculating operation; 22 an interruption controlling unit (hereinafter referred to as an ICU) for receiving demands for a particular processing or a timely processing of the CPU 21 to control the CPU 21, other than to control a program flow to be executed in the CPU 21, and controlling the CPU 21; 23 a random access memory (hereinafter referred to as a RAM) for storing therein reference data, processing data and instruction codes. Furthermore, the microcomputer 20 includes various functional circuits and registers for these functions.

The ICU 22 has a break interruption signal generating circuit 24 for generating a break interruption signal (hereinafter referred to as a BRK signal) 25 to the CPU 21 in response to a certain signal. The CPU 21 has an interruption vector generating circuit 26 for generating a vector address in response to an interruption demand factor demanded by the break interruption signal generating circuit 24; a program counter 27 for generating an address designating each functional circuit for executing a program; and a status signal generating circuit 28 for generating a status signal showing the operating status of the CPU 21.

Reference numeral 29 denotes an address bus for transmitting an address signal outputted from the program counter; 30 a data bus for exchanging data between an emulator 40 and various functional circuits such as the CPU 21, the ICU 22 and the RAM 23; 31 a synchronous signal (hereinafter referred to as a SYNC) showing the fetch status of an instruction; 32 a read signal (hereinafter referred to as RD) showing the status where the CPU 21 reads data; 33 a write signal (hereinafter referred to as a WR) showing the status where the CPU 21 writes data. These SYNC 31, RD 32 and WR 33 constitute a status signal, which is outputted from the status signal generating circuit 28.

Reference numeral 34 denotes a break address storing register, included in the microcomputer 20, for storing a break address which is a break condition; 35 a break address coincidence detecting circuit, included in the microcomputer 20, for detecting a coincidence by comparing the break addresses stored in the break address storing register 34 with an address signal on the address bus 29; 36 an AND circuit for outputting a logical product of an output from the break address coincidence detecting circuit 34 and an output form the emulator 40, which AND circuit 36 constitutes a break determining circuit for determining whether an output from the break address coincidence detecting circuit 35 is valid or invalid on the basis of a signal from the emulator 40.

Reference numeral 37 denotes an OR circuit for outputting a logical sum of a break instruction signal (hereinafter referred to as an S. BRK) 38 generated by software and an output from the AND circuit 36, which OR circuit constitutes a break interruption demand circuit for outputting a break interruption demand signal.

On the other hand, in the emulator 40, reference numeral 41 denotes a program memory for storing a program which is an object to be emulated (hereinafter referred to as a program to be emulated) in the microcomputer 20; 42 a trace memory for tracing an execution sequence of the microcomputer 20 operated by the program to be emulated. The trace memory 40 traces an address signal of the address bus 29 from the microcomputer 20, data of the data bus 30, and signals of a SYNC signal line 31, a RD signal line 32 and a WR signal line 33 to confirm the operation of the program to be executed.

Furthermore, reference numeral 43 denotes an access condition determining circuit, as a part of a breakcondition detecting mechanism, and which determines a condition for accessing a break condition (hereinafter referred to an access condition) stored in the break address storing register 34. This access condition determining circuit 43 is composed of an access condition storing register 44 which stores an access condition address designating an address as an access condition; an access condition coincidence detecting circuit 45 which compares the stored access condition address with an address signal AD outputted from the microcomputer 20 to detect a coincidence; and an access point pass counter 46 which counts coincidence detecting signals from the access condition coincidence detecting circuit 45 to detect overflow. The output from the access point pass counter 46 is given to the AND circuit (break determining circuit) 36 in the microcomputer 20 as a break allowance signal which finally determines to access to a break point of a program executed in the microcomputer 20.

Reference numerals 47a to 47e denote switches which receive the break allowance signal to control a connection or a disconnection of input from the address bus 29, the line of the SYNC signal 31, the line of the RD signal 31, the line of the WR signal 33 and the data bus 30 to the trace memory 42, respectively. In the following the line of the SYNC signal 31, the line of the RD signal 32, and the line of the WR signal 33 are also denoted by the same reference numerals 3, 32, and 33, respectively.

Figure 3:
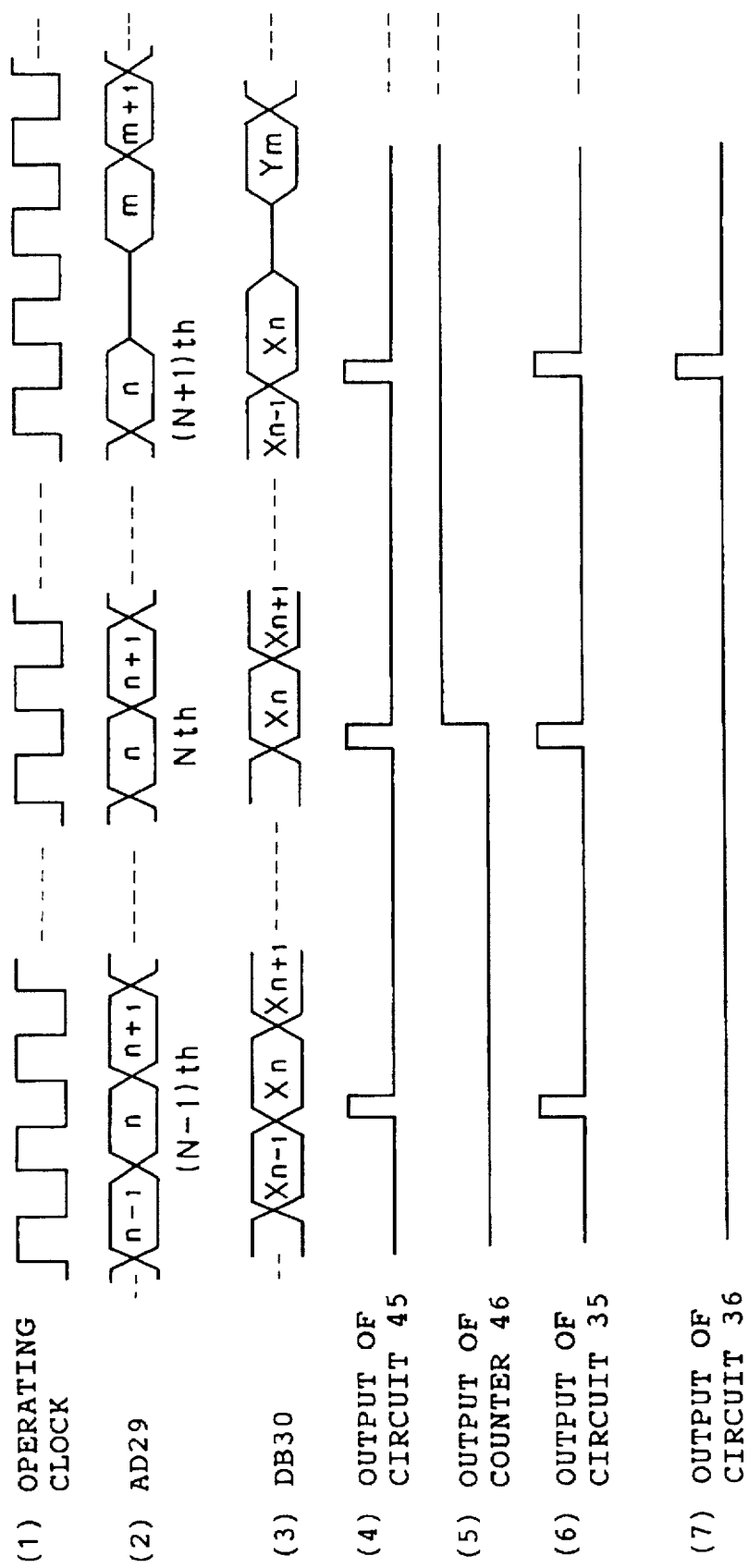
FIG. 3 is a timing chart showing operation of each part in the emulation apparatus of FIG. 2.

Next, operation of the emulation apparatus as shown in FIG. 2 will be explained referring to a timing chart of FIG. 3. Although not shown in FIG. 2, the microcomputer 20 and emulator 40 are operated in response to operation clocks as shown in FIG. 3.

A case will be explained where, in accordance with a program to be emulated, a subroutine program is executed plural times; and a break interruption is carried out after an address "n" designating an instruction code "Xn" in the subroutine program is outputted N times, but before the next address "n" is outputted and the instruction code "Xn" to be executed is executed. Here, "n" is any integer and designates the number of an address. "N" is any integer.

Before executing an emulation operation, signals indicating an address "n" are stored as a break condition and an access condition in the break address storing register 34 and access condition storing register 43, respectively. An overflow count number of the access point pass counter 46 is set to "N". A program to be emulated, which is to be executed by the microcomputer 20, is previously written in the program memory 41. The access point pass counter 46 is initially set to "L" and all the switches 47a to 47e are at the off (cutoff) state.

First, the program counter 27 in the CPU 21 successively outputs address signals to the address bus 29. The program memory 41 outputs instruction codes, of the program to be emulated, designated by the addresses, to the CPU 21 via the data bus 30. The CPU 21 decodes the instruction codes and executes the instructions, thereby performing an emulating operation. Since an instruction code "Xn" in the subroutine is executed plural times in the program to be emulated, an address "n" is outputted to the address bus 29 plural times as shown in FIG. 3.

Referring to FIG. 3, addresses are successively outputted by the program counter in accordance with operation clocks of the microcomputer 20. Upon outputting the (N-1)th address "n", the address condition coincidence circuit 45 detects a coincidence between the (N-1)th address "n" and an address "n" stored in the access condition storing register to output a coincidence detecting signal. Although not shown in the drawing, an address "n" has already outputted "(N-2)" times and a coincidence detecting signal is accordingly outputted each time.

At the time of outputting the (N-1)th address "n", the output of the access point pass counter 46 remains at the "L" state.

The status signal generating circuit 28 outputs a SYNC signal 31 indicating that the CPU 2 is in operation of fetching an instruction code. The program memory 41 is constructed so as to receive an address "n" synchronously with the SYNC signal 31. The status signal generating circuit 28 outputs an RD signal 32 indicating that the CPU 2 is in operation of reading data. Upon receiving the RD signal 32, the program memory 41 outputs an instruction code "Xn" to the CPU 2. The instruction code "Xn" is read by the CPU 2 to be executed. Regarding other instruction codes, similar operations are carried out.

Thereafter, when the Nth address "n" is outputted, the access condition coincidence detecting circuit 45 similarly outputs a coincidence detecting signal. The access point pass counter 46 detects the Nth coincidence detecting signal in response to the address coincidence and changes its output from "L" to "H" synchronously with this fall of the coincidence detecting signal. Thereafter, when the (N+1)th coincidence detecting signal with respect to the address "n" is outputted, overflow is recognized and the "H" state is maintained. This "H" state is inputted to the AND circuit 36 and to the switches 47a to 47b as a break allowance signal.

Similarly, the break address storing register 34 also stores an address "n". The break address coincidence detecting circuit 35 compares this address "n" with an address signal outputted to the address bus 29. When they coincide with each other, the circuit 35 outputs a coincidence detecting signal. For example, as shown in FIG. 3, the coincidence detecting signal from the brake address coincidence detecting circuit 35 is outputted at the same timing as that from the access condition coincidence detecting circuit 45. An output of the break address coincidence detecting circuit 35 is inputted to the AND circuit 36 which is a break determining circuit. Thus, only when the output of the access point pass counter 46 is at the state "H", a coincidence detecting signal of the break address coincidence detecting circuit 35 is given to the OR circuit 37.

When the break address storing register 34 outputs the (N+1)th coincidence detecting signal with respect to the address "n", the coincidence detecting signal is outputted from the AND circuit 36 while the access point pass counter 46 is at the "H" state. Namely, the break determining circuit (AND circuit 36) first determines validness upon detecting the (N+1)th coincidence with the address "n", resulting in inputting the coincidence detecting signal to the OR circuit 37.

The other input to the OR circuit 37 is a software break signal (S. BRK signal) 38. The signal 38 is a break interruption demand signal generated by decoding a break instruction code, which is written in the program memory 41, in the CPU 2. However, in this embodiment, it is assumed that this S. BRK signal 38 is not generated to remain the "L" state. Thus, the (N+1)th coincidence detecting signal with respect to an address "n" is inputted as it is from the OR circuit 37 to the ICU 22 as a break interruption demand signal.

The break interruption generating circuit 24 generates a break interruption signal based on the inputted coincidence detecting signal as a break interruption demand signal.

When this break interruption signal is inputted to the CPU 21, the CPU 21 starts an interruption operation. The CPU 21 controls such that it does not incorporate an instruction code "Xn" outputted to the data bus 30 in response to an address "n"; or even if incorporated, its execution is stopped. The interruption vector generating circuit 26 included in the CPU 21 generates a vector address in response to an interruption demand factor corresponding to the break interruption signal and outputs it to the program counter 27.

Upon receiving this vector address, the program counter 27 does not output an address "(n+1)" which is an address signal next to the address "n" but outputs an address "m" designating an instruction code of a monitor program for incorporating the contents of microcomputer operation into the trace memory 42 to be monitored.

On the other hand, in the emulator 40, upon receiving a break allowance signal of the "H" state from the access point pass counter 46, the OFF state of the switches 47a to 47e is changed to the ON state so that data and signals from the address bus 29, the data bus 30, the SYNC signal line 31, the RD signal line 32 and the WR signal line 33 are incorporated into the trace memory 42.

The program memory 41 stores the monitor program therein. This monitor program is started by incorporating the address "m" as an interruption process of the CPU 2. By executing the monitor program, the execution state of a program to be emulated at the time of stopping execution, for example, data in each resister (not shown) in the microcomputer 20 and data in the RAM 23 are written in the trace memory 42 via the switches 47a to 47e.

As mentioned above, in case where an instruction code "Xn" in a subroutine is executed plural times, and a break is done immediately before an execution of the (N+1)th instruction code "Xn" for example, an access condition corresponding to the break condition is that the address "n" is outputted N times; and in the emulator, after microcomputer operation traces this access condition, the microcomputer itself detects a coincidence of the address "n" which is the break condition.

According to this embodiment, in case where a program break operation is done after an instruction code is executed plural times, the microcomputer is provided with a mechanism for detecting a coincidence with respect to a break condition which determines a break operation (namely, microcomputer operation traces an access condition), while the emulator is provided with a mechanism for detecting a coincidence with respect to an access condition to access the break condition. Since only the final break point is detected in the microcomputer, it is not necessary to provide, in the microcomputer, a counter for counting plural coincidence detecting signals. Upon coinciding with a break condition, a break demand signal of an executed program can be generated to the CPU 21.

Furthermore, since a break demand signal is generated inside the microcomputer, the conventional problem, i.e. the transmission of an interruption demand signal to the ICU 22 is delayed due to the wiring capacity between a microcomputer and an emulator, is basically removed. Accordingly, the interruption at a certain break point can be securely done. Particularly, a microcomputer is recently required to operate in response to clocks at high frequencies of 10 MHz or more. Interruption processing at the emulation time can be correctly done even in such a microcomputer of high operating frequencies.

Moreover, since there is provided only mechanism for detecting a coincidence with respect to the final break condition on the microcomputer side, a circuit area to be mounted on the microcomputer can be smaller. Thus, when the microcomputer is practically used as it is, it can be miniaturized.

In this embodiment, the switches 47a to 47e control data and signals inputted from the address bus 29, the data bus 30, the SYNC signal line 31, the RD signal line 32 and the WR signal line 33 to the trace memory 42. However, these switches can be removed so that the signals can be always inputted and the status of the above signal lines can be stored at each input clock unit, thereby realizing execution sequence of a program to be emulated.

In addition, although interruption processing is done in such a hardware construction in this embodiment, however, interruption processing may be done in both hardware and software by previously inserting a break instruction code into an emulated program, and by inputting, to the signal line 38 shown in FIG. 2, an interruption demand signal generated by decoding the break instruction code in the CPU 20.

Embodiment 2

In Embodiment 1, the access condition storing register 44 holds the same address as that in the break address storing register 34. However, this is not a limitation. The registers can store any address depending on conditions under which break of an emulation program is done. For example, if an address "a" designating an instruction code "Z" is stored in the access condition storing register 44, whereas an address "n" designating an instruction code "Xn" is stored in the break address storing register 34 like Embodiment 1; break is done after executing the instruction code "Z" N times, but immediately before executing the instruction code "Xn".

Embodiment 3

Figure 4:
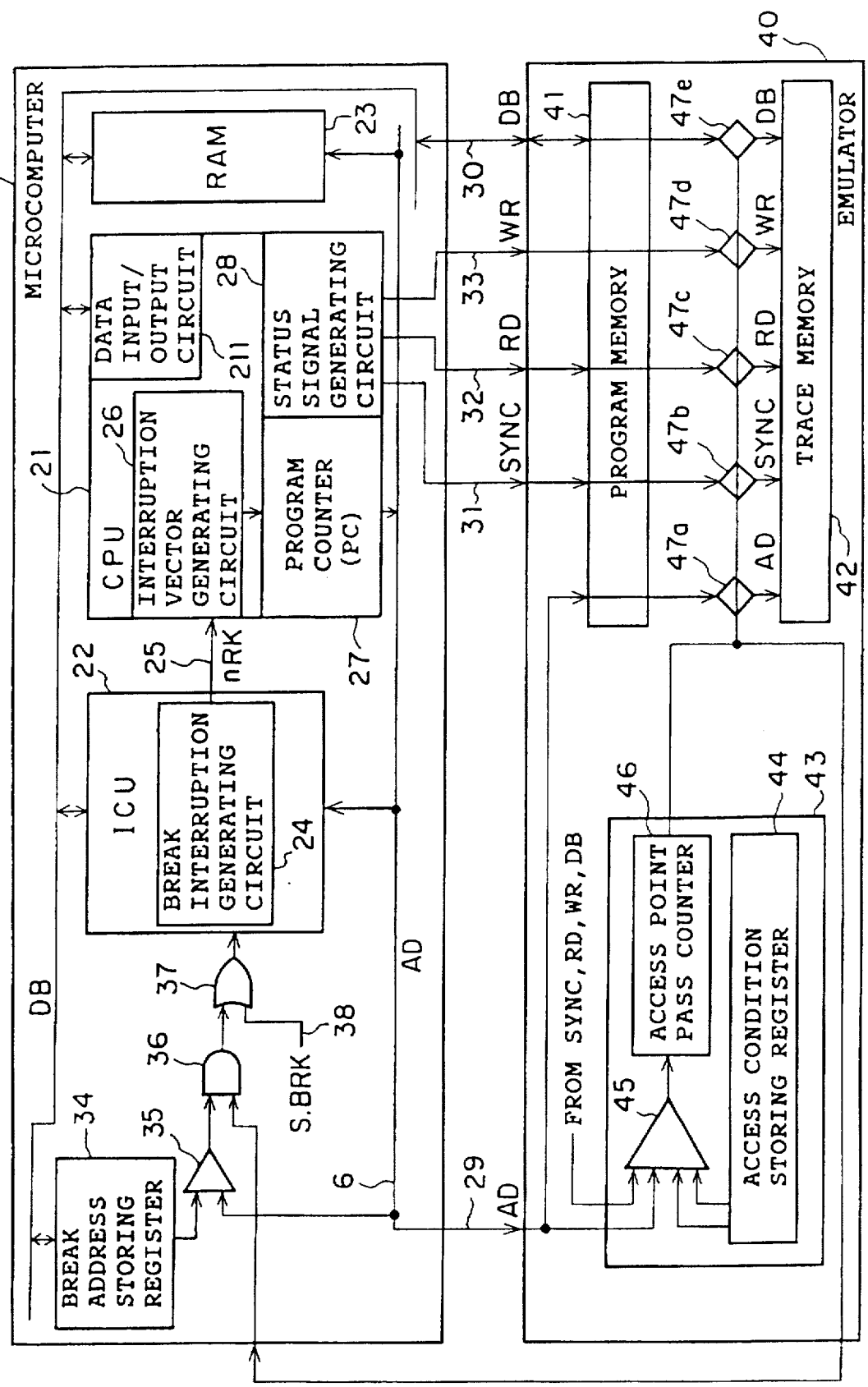
FIG. 4 is a circuit construction diagram showing an emulation apparatus in accordance with Embodiment 3 of the invention.

As shown in FIG. 4, the data bus 30, the SYNC signal line 31, the RD signal line 32, the WR signal line 33, which are inputted to the emulator 40, as well as the address bus 29 can be inputted to the access condition coincidence circuit 45. In this case, the access condition coincidence circuit 45 can set an access condition for accessing a break condition in the access condition storing register 44 using these signals in accordance with applications.

For example, a case will be described where a break is done after date "Z" is written in an address number "A", but immediately before an instruction code "Xn" to be executed is executed. An address "n" designating an instruction code "Xn" is stored in the break address storing register 34, while an address "A", a WR signal and data "Z" are stored in the access condition storing register 44. The access point pass counter 46 is constructed such that one coincidence detecting signal results in overflow.

Figure 5:
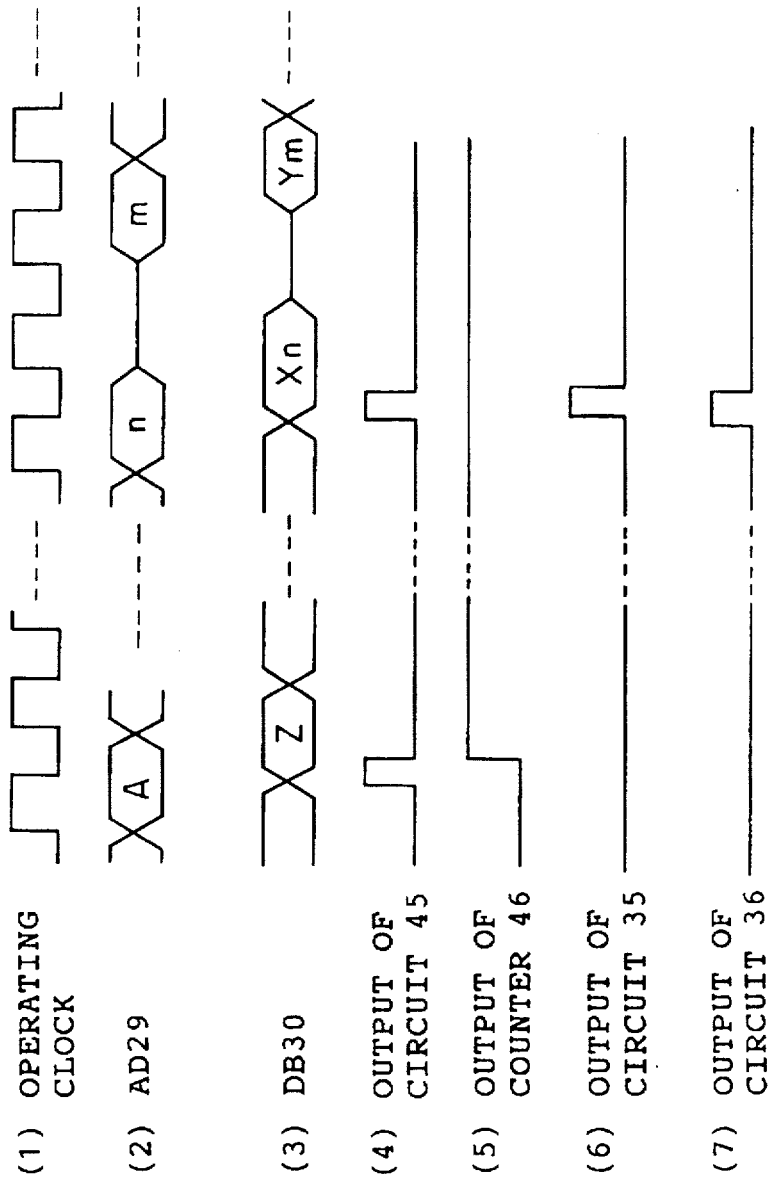
FIG. 5 is a timing chart showing operation of each part in the emulation apparatus of FIG. 4.

Referring to a timing chart of FIG. 5, an address "A" is given to the address bus 29 and, as a result of execution by the CPU 2, data "Z" is given to the data bus 30. The status signal generating circuit 28 outputs a WR signal. When data "Z" is written in an address number "A", the address condition coincidence detecting circuit 45 outputs a coincidence detecting signal in response to a coincidence with the address "A" and the data "Z". Upon receiving it, the access point pass counter 46 becomes at the "H" state. This "H" state is inputted to the AND circuit 36. A coincidence detecting signal transmitted thereafter from the break coincidence detecting circuit 34 to the AND circuit 36 is determined to be valid. This coincidence detecting signal is outputted from the AND circuit 36 as an interruption demand signal. The same operations as those in Embodiment 1 are then followed.

Moreover, if only an address and a WR signal are stored in the access condition storing register 44, a break allowance signal can be outputted when any data is written in the number designated by the address.

Furthermore, a SYNC signal and a RD signal as well as an address and data can be stored in the access condition storing register 44. For example, if an address and a RD signal are stored, "reading any data from the site designated by the address" can be set as an access condition.

Embodiment 4

Figure 6:
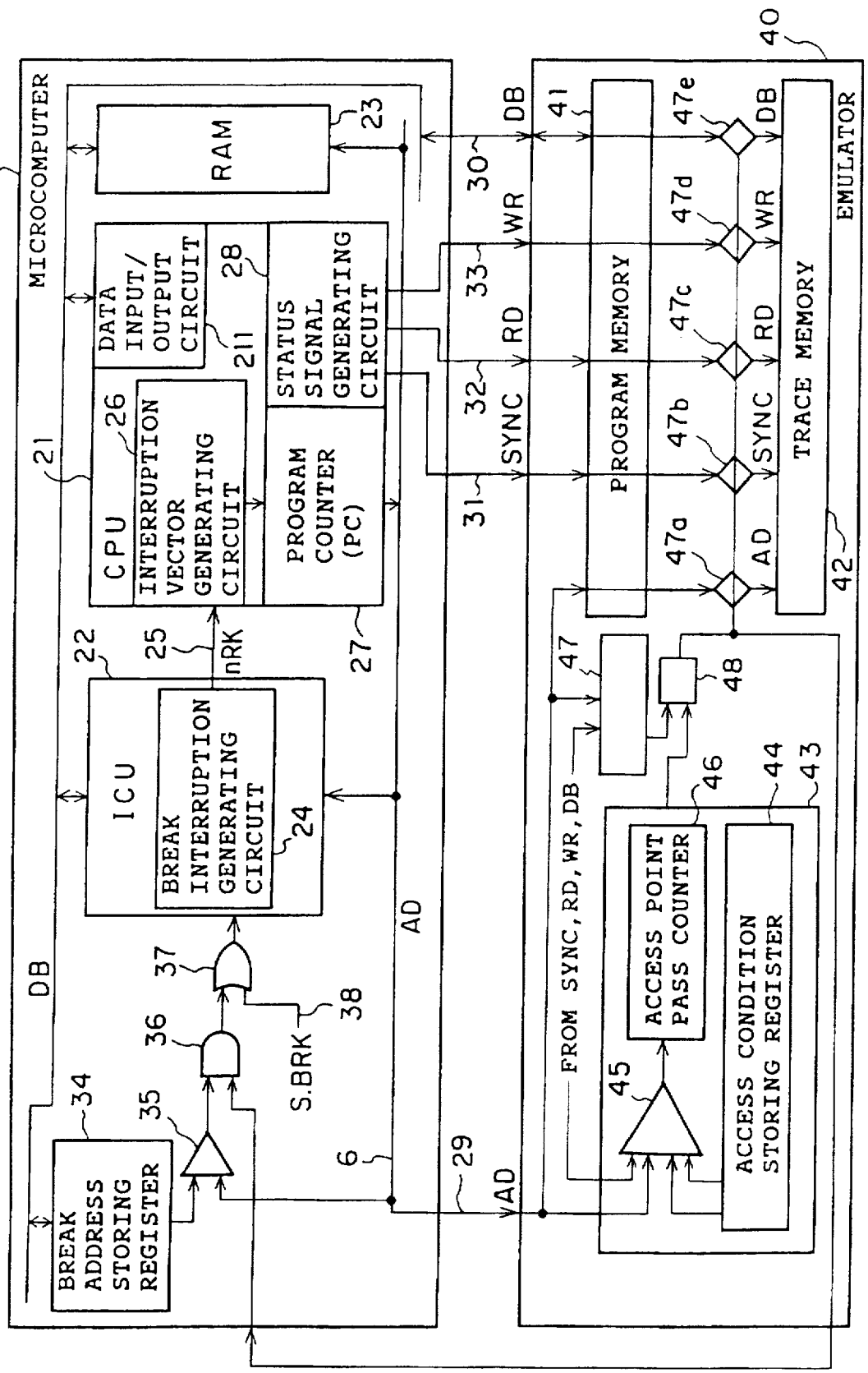
FIG. 6 is a circuit construction diagram showing an emulation apparatus in accordance with Embodiment 4 of the invention.

FIG. 6 is a circuit construction view showing an emulation apparatus of this embodiment. Reference numeral 43 denotes a first access condition determining circuit, 47 a second access condition determining circuit. Both the circuits 43 and 47 have the same construction as the access condition determining circuit of Embodiment 3. Reference numeral 48 denotes a logical circuit for receiving detecting signals from the access condition determining circuits 43 and 47 to generate a break allowance signal. The other reference numerals denote the same parts as those in Embodiment 3.

The first and second access condition determining circuits 43 and 47 permit a more complicated access condition. For example, the first access condition determining circuit 43 is set such that the circuit 43 outputs a detecting signal upon detecting an address "n" N times, while the second access condition determining circuit 47 is set such that the circuit 47 outputs a detecting signal upon detecting an address "m" M times. Since a logical circuit 48 is constructed by an AND circuit, when the execution status of the microcomputer 20 satisfies N outputs of the address "n" and M outputs of the address "m", the logical circuit 48 outputs a break allowance signal. This break allowance signal is given to the AND circuit 36 as an allowance signal for determining the affectivity of a coincidence with a break condition in the microcomputer 20. The other operations are the same as those in Embodiment 1.

Note that an address to be stored in the break address storing register 34, which address is a break condition, indicates the final break point. This is not limited to the above address "n" and address "m".

Furthermore, the logical circuit 48 may be constructed so as to selectively produce each of detecting signals from the first and second access condition determine circuit 43, 47 as a break point other than an AND circuit.

In addition, as shown in Embodiment 3, the access condition storing register 44 may store therein not only an address but also data and signals, as a result of an executing an instruction, on the data bus 30, the SYNC signal line 31, the RD signal line 32, and the WR signal line 33, thereby allowing a secure break operation even under more complicated access conditions. There may be provided a plurality of access condition determining means whose construction is the same as that of the embodiment in accordance with access conditions.

Embodiment 5

Figure 7:
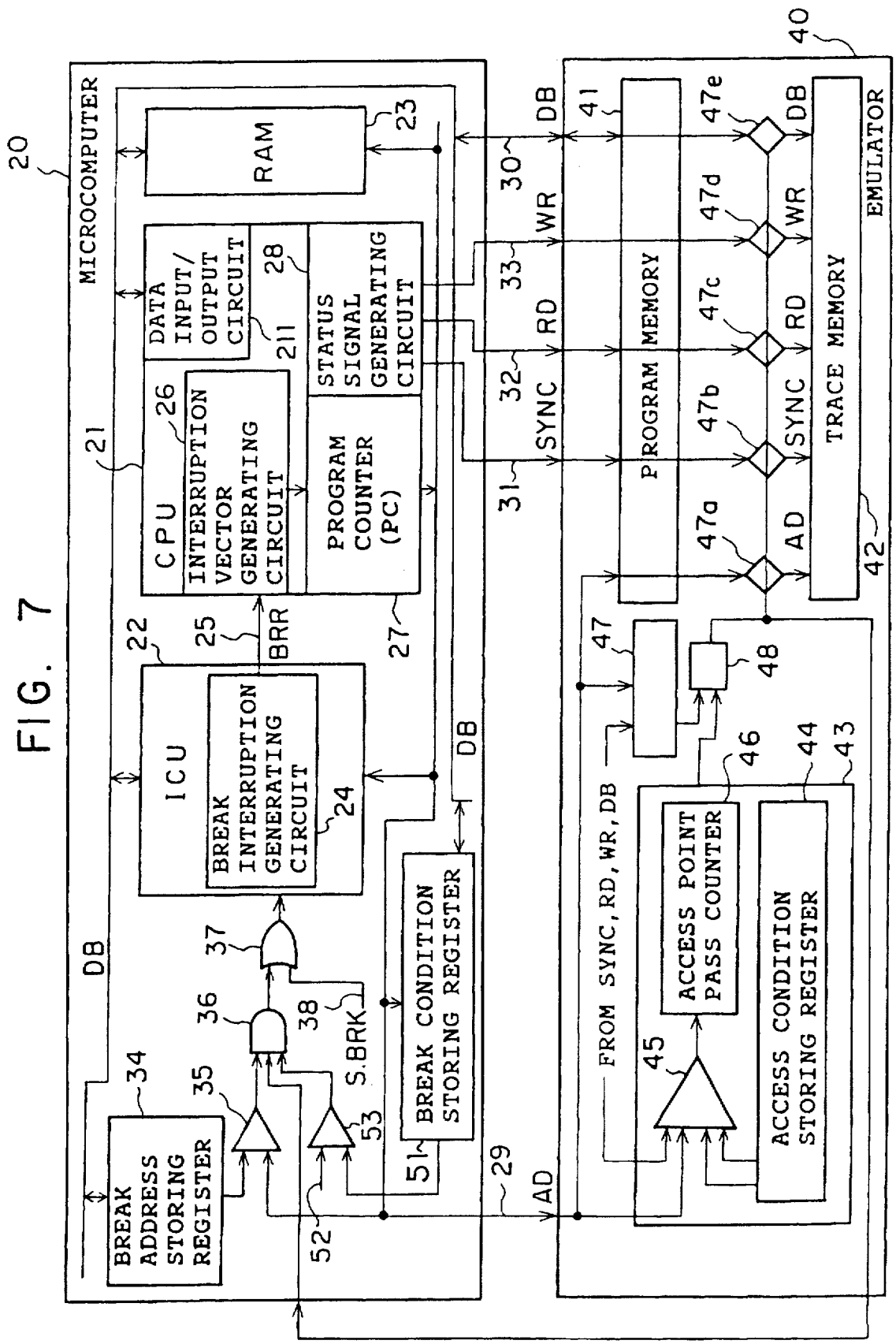
FIG. 7 is a circuit construction diagram showing an emulation apparatus in accordance with Embodiment 5 of the invention.

FIG. 7 is a circuit construction view showing an emulation apparatus of the embodiment. In the drawing, reference numeral 51 denotes a break condition storing register for storing a data signal other than an address as a break condition. Execution result data, a SYNC signal, a RD signal, a WR signal and the like are stored therein via the data buses. Reference numeral 53 denotes a break condition coincidence detecting circuit for detecting a coincidence by comparing various signals 52 with the contents stored in the break condition storing register 51. The other reference numerals denote parts with the same construction and operation as those in Embodiments 1 to 4. The AND circuit 36 outputs a logical product of outputs from the break address coincidence detecting circuit 35, break condition coincidence detecting circuit 53 and logical circuit 48 in the emulator 48.

In the embodiment, further desirable conditions other than an address can be set as the final break condition.

(1) An address "A" is stored in the break address storing register 34, while a RD signal is stored in the break condition storing register 51. Interruption processing is done at the time of reading from the address number "A" as the final break condition.

(2) An address "A" is stored in the break address storing register 34, while a RD signal and data "Z" are stored in the break condition storing register 51. Interruption processing is done at the time of reading the data "Z" from the address number "A" as the final break condition.

(3) An address "A" is stored in the break address storing register 34, while a WR signal is stored in the break condition storing register 51. Interruption processing is done at the time of writing to the address number "A" as the final break condition.

(4) An address "A" is stored in the break address storing register 34, while a WR signal and data "Z" are stored in the break condition storing register 51. Interruption processing is done at the time of writing the data "Z" to the address number "A" as the final break condition.

(5) An address "A" and a SYNC signal are stored in the break address register 32. Interruption processing is done at the time of fetching an instruction code in the address "A". This is employed for debug processing in case of fetching an instruction at undesirable timing.

Thus, in accordance with emulating operations, any necessary break condition can be set by separately using data-reading, data-writing, instruction-fetching and the like. At the same time, this emulating mechanism can be constructed with a simple hardware circuit in the microcomputer 20.

As described above, according to the emulation apparatus of the first aspect, a coincidence of an address signal with an access condition address to access a break condition is detected on the emulation side, and this detecting signal is inputted to a break allowance determining means as a break allowance signal on the microcomputer side. On the microcomputer side, when a coincidence of an address signal with a break address which is a break condition is detected and the break allowance determining means receives the break allowance signal from an emulator, the coincidence detecting signal with the break address is determined to be valid to be outputted as an interruption demand signal, thus allowing interruption control of central processing means. Consequently, interruption processing is done when the same address signal as the access condition address is outputted and thereafter an address signal coincides with the break address. Furthermore, in the microcomputer, immediately after the coincidence detecting signal with the break address is generated, the interruption processing can be done without delay as an interruption demand signal. An effect is therefore obtained that interruption processing is securely done at a certain point of program execution. Particularly, even in a microcomputer operated at high frequencies, the effect is obtained that interruption processing is correctly done at a certain point of a program at the time of emulation.

Since access condition determining means outputs a break point signal when an address signal coincides with an access condition address plural times, interruption is done when the same address signal as the access condition address is outputted certain plural times and thereafter an address signal coincides with a break address. In this case, inside the microcomputer, immediately after a coincidence detecting signal with the break address is generated, the interruption processing is done without delay as an interruption demand signal. An effect is therefore obtained that interruption processing is securely done at a certain point of program execution.

The emulator of the second aspect is constructed such that a first coincidence signal is outputted when a coincidence of an address signal from central processing means with a first access condition address is detected; a second coincidence signal is outputted when a coincidence of an address signal with a second access condition address is detected; and when the first and second coincidence signals are detected, a break allowance signal is outputted to break allowance determine means. Thus, plural access condition addresses for allowing a break address can be set. An effect is therefore obtained that even if conditions to access the final break point are complicated, interruption processing is securely done at a certain point.

As one example, in the first and second aspects, a break address is an address designating an instruction code in a program, and when break allowance determining means determines that a coincidence detecting signal is valid, break controlling means controls central processing means such that the central processing means does not execute the instruction code. Thus, this allows an emulating operation wherein break is performed by a desired instruction code.

As another example, in the first and second aspects, a break address is an address designating a site from which data is read or to which data is written, and when break allowance determining means determines that a coincidence detecting signal is valid and data is read from or written to the site designated by the break address, break controlling means stops processing of central processing means. Thus, this allows an emulating operation wherein break is performed at the time of reading or writing data in a desired address number.

Further, in the first and second aspects, break condition coincidence detecting means stores a break address and a first data value; and when an address signal coincides with the break address and a data signal outputted to a data bus transmitting data coincides with the first data value, break address condition detecting means outputs a coincidence detecting signal; and when break allowance determining means determines that the coincidence detecting signal is valid and the first data value is read from or written to a site designated by the break address, break controlling means stops processing of central processing means. Thus, this allows an emulating operation wherein break is performed at the time of reading or writing desired data in a desired address number.

Further, in the first and second aspects, an access condition address is an address designating an instruction code in a program. Thus, an emulation apparatus can be easily set such that a break operation is performed after executing a desired instruction code.

Further, in the first and second aspects, an access condition address is an address designating a site from which data is read or to which data is written. Thus, an emulation apparatus can be easily set such that a break operation is performed after reading or writing data in a desired address number.

Further, in the first and second aspects, access condition determining means has data storing means for storing a second data value, and detects that an address signal coincides with an access condition address designating a site from which the second data value is read or to which the second data value is written and that a data signal outputted to a data bus transmitting data coincides with the second data value. Thus, an emulation apparatus can be easily set such that a break operation is performed after reading or writing a desired data value in a desired address number.

What is claimed is:

1. An emulation apparatus including a microcomputer and an emulator for controlling an emulating operation of the microcomputer, the apparatus controlling interruption of a program executed by the microcomputer:

the microcomputer comprising:
central processing means for outputting an address signal to execute the program;
break condition coincidence detecting means for storing a break address indicating a break condition, and for outputting a coincidence detecting signal when the address signal coincides with the break address;
break allowance determining means for determining whether the coincidence detecting signal is valid or invalid; and
break controlling means for receiving the coincidence detecting signal when it is valid and for controlling the central processing means to stop execution and processing of the program;

the emulator comprising:
access condition determining means for storing an access condition address to access the break condition, monitoring the address signals, and outputting a break allowance signal to the break allowance determining means when a coincidence of an address signal with the access condition address is detected;
wherein when the break allowance signal is inputted to the break allowance determining means, it determines that the coincidence detecting signal is valid.

2. The emulation apparatus of claim 1, wherein when an address signal coincides with the access condition address multiple times, the access condition determining means outputs the break allowance signal.

3. The emulation apparatus of claim 2, wherein
the access condition determining means comprises:
an access condition storing register for storing the access condition address;
a condition coincidence detecting circuit for outputting a condition coincidence signal when an address signal coincides with the access condition address; and
a counter for outputting the break allowance signal when the condition coincidence signal is counted multiple times.

4. The emulation apparatus of claim 1, wherein the break address is an address designating an instruction code in the program, and when the break allowance determining means determines that the coincidence detecting signal is valid, the break controlling means controls the central processing means such that the central processing means does not execute the instruction code.

5. The emulation apparatus of claim 2, wherein the break address is an address designating an instruction code in the program, and when the break allowance determining means determines that the coincidence detecting signal is valid, the break controlling means controls the central processing means such that the central processing means does not execute the instruction code.

6. The emulation apparatus of claim 3, wherein the break address is an address designating an instruction code in the program, and when the break allowance determining means determines that the coincidence detecting signal is valid, the break controlling means controls the central processing means such that the central processing means does not execute the instruction code.

7. The emulation apparatus of claim 1, wherein the break address is an address designating a site from which data is read or to which data is written, and when the break allowance determining means determines that the coincidence detecting signal is valid and data is read from or written to the site designated by the break address, the break controlling means stops processing of the central processing means.

8. The emulation apparatus of claim 2, wherein the break address is an address designating a site from which data is read or to which data is written, and when the break allowance determining means determines that the coincidence detecting signal is valid and data is read from or written to the site designated by the break address, the break controlling means stops processing of the central processing means.

9. The emulation apparatus of claim 3, wherein the break address is an address designating a site from which data is read or to which data is written, and when the break allowance determining means determines that the coincidence detecting signal is valid and data is read from or written to the site designated by the break address, the break controlling means stops processing of the central processing means.

10. The emulation apparatus of claim 1, wherein
the break condition coincidence detecting means stores the break address and a first data value;
when an address signal coincides with the break address and a data signal outputted to a data bus transmitting data coincides with the first data value, the break address condition detecting means outputs the coincidence detecting signal; and
when the break allowance determining means determines that the coincidence detecting signal is valid and the first data value is read from or written to a site designated by the break address, the break controlling means stops processing of the central processing means.

11. The emulation apparatus of claim 2, wherein
the break condition coincidence detecting means stores the break address and a first data value;
when an address signal coincides with the break address and a data signal outputted to a data bus transmitting data coincides with the first data value, the break address condition detecting means outputs the coincidence detecting signal; and
when the break allowance determining means determines that the coincidence detecting signal is valid and the first data value is read from or written to a site designated by the break address, the break controlling means stops processing of the central processing means.

12. The emulation apparatus of claim 3, wherein
the break condition coincidence detecting means stores the break address and a first data value;
when an address signal coincides with the break address and a data signal outputted to a data bus transmitting data coincides with the first data value, the break address condition detecting means outputs the coincidence detecting signal; and
when the break allowance determining means determines that the coincidence detecting signal is valid and the first data value is read from or written to a site designated by the break address, the break controlling means stops processing of the central processing means.

13. The emulation apparatus of claim 1, wherein the access condition address is an address designating an instruction code in the program.

14. The emulation apparatus of claim 2, wherein the access condition address is an address designating an instruction code in the program.

15. The emulation apparatus of claim 3, wherein the access condition address is an address designating an instruction code in the program.

16. The emulation apparatus of claim 1, wherein the access condition address is an address designating a site from which data is read or to which data is written.

17. The emulation apparatus of claim 2, wherein the access condition address is an address designating a site from which data is read or to which data is written.

18. The emulation apparatus of claim 3, wherein the access condition address is an address designating a site from which data is read or to which data is written.

19. The emulation apparatus of claim 1, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

20. The emulation apparatus of claim 2, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

21. The emulation apparatus of claim 3, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

22. An emulation apparatus of claim 1, wherein the access condition determining means comprises:

first access condition determining means for storing a first access condition address to access the break condition, monitoring the address signals, and outputting a first coincidence signal when a coincidence of an address signal with the first access condition address is detected;

second access condition determining means for storing a second access condition address to access the break condition, monitoring the address signals, and outputting a second coincidence signal when a coincidence of an address signal with the second access condition address is detected; and a logical circuit for outputting a break allowance signal when the first and second coincidence signals are detected.

23. The emulation apparatus of claim 22, wherein the break address is an address designating an instruction code in the program, and when the break allowance determining means determines that the coincidence detecting signal is valid, the break controlling means controls the central processing means such that the central processing means does not execute the instruction code.

24. The emulation apparatus of claim 22, wherein the break address is an address designating a site from which data is read or to which data is written, and when the break allowance determining means determines that the coincidence detecting signal is valid and data is read from or written to the site designated by the break address, the break controlling means stops processing of the central processing means.

25. The emulation apparatus of claim 22, wherein the break condition coincidence detecting means stores the break address and a first data value;

when an address signal coincides with the break address and a data signal outputted to a data bus transmitting data coincides with the first data value, the break address condition detecting means outputs the coincidence detecting signal; and when the break allowance determining means determines that the coincidence detecting signal is valid and the first data value is read from or written to a site designated by the break address, the break controlling means stops processing of the central processing means.

26. The emulation apparatus of claim 22, wherein the access condition address is an address designating an instruction code in the program.

27. The emulation apparatus of claim 22, wherein the access condition address is an address designating a site from which data is read or to which data is written.

28. The emulation apparatus of claim 22, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

29. The emulation apparatus of claim 23, wherein the access condition address is an address designating an instruction code in the program.

30. The emulation apparatus of claim 23, wherein the access condition address is an address designating a site from which data is read or to which data is written.

31. The emulation apparatus of claim 23, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

32. The emulation apparatus of claim 24, wherein the access condition address is an address designating an instruction code in the program.

33. The emulation apparatus of claim 24, wherein the access condition address is an address designating a site from which data is read or to which data is written.

34. The emulation apparatus of claim 24, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

35. The emulation apparatus of claim 25, wherein the access condition address is an address designating an instruction code in the program.

36. The emulation apparatus of claim 25, wherein the access condition address is an address designating a site from which data is read or to which data is written.

37. The emulation apparatus of claim 25, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

38. The emulation apparatus of claim 1, wherein the microcomputer and the emulator are fabricated on a same large scale integrated circuit and are connected through internal wiring formed on a semiconductor substrate of the large scale integrated circuit.

39. An emulation apparatus including a microcomputer and an emulator for controlling an emulating operation of the microcomputer, the apparatus controlling interruption of a program executed by the microcomputer;

the microcomputer comprising:
central processing means for outputting address signals and processing for executing the program;
break condition coincidence detecting means for storing a break address indicating a break condition, and outputting a coincidence detecting signal when an address signal coincides with the break address;
break allowance determining means for determining whether the coincidence detecting signal is valid or invalid; and
break controlling means for receiving the coincidence detecting signal when it is valid and controlling the central processing means to stop execution and processing of the program;

the emulator comprising:
first access condition determining means for storing a first access condition address to access the break condition, monitoring the address signals, and outputting a first coincidence signal when a coincidence of an address signal with the first access condition address is detected;

second access condition determining means for storing a second access condition address to access the break condition, monitoring the address signals, and outputting a second coincidence signal when a coincidence of an address signal with the second access condition address is detected; and a logical circuit for outputting a break allowance signal when the first and second coincidence signals are detected;

wherein the first and second access condition determining means detect that an address signal coincides with at least one of the first and second access condition addresses multiple times;

wherein when the break allowance signal is inputted to the break allowance determining means, the break allowance determining means determines that the coincidence detecting signal is valid.

40. The emulation apparatus of claim 39, wherein the break address is an address designating an instruction code in the program, and when the break allowance determining means determines that the coincidence detecting signal is valid, the break controlling means controls the central processing means such that the central processing means does not execute the instruction code.

41. The emulation apparatus of claim 39, wherein the break address is an address designating a site from which data is read or to which data is written, and when the break allowance determining means determines that the coincidence detecting signal is valid and data is read from or written to the site designated by the break address, the break controlling means stops processing of the central processing means.

42. The emulation apparatus of claim 39, wherein the break condition coincidence detecting means stores the break address and a first data value;

when an address signal coincides with the break address and a data signal outputted to a data bus transmitting data coincides with the first data value, the break address condition detecting means outputs the coincidence detecting signal; and when the break allowance determining means determines that the coincidence detecting signal is valid and the first data value is read from or written to a site designated by the break address, the break controlling means stops processing of the central processing means.

43. The emulation apparatus of claim 39, wherein the access condition address is an address designating an instruction code in the program.

44. The emulation apparatus of claim 39, wherein the access condition address is an address designating a site from which data is read or to which data is written.

45. The emulation apparatus of claim 39, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

46. The emulation apparatus of claim 40, wherein the access condition address is an address designating an instruction code in the program.

47. The emulation apparatus of claim 40, wherein the access condition address is an address designating a site from which data is read or to which data is written.

48. The emulation apparatus of claim 40, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

49. The emulation apparatus of claim 41, wherein the access condition address is an address designating an instruction code in the program.

50. The emulation apparatus of claim 41, wherein the access condition address is an address designating a site from which data is read or to which data is written.

51. The emulation apparatus of claim 41, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

52. The emulation apparatus of claim 42, wherein the access condition address is an address designating an instruction code in the program.

53. The emulation apparatus of claim 42, wherein the access condition address is an address designating a site from which data is read or to which data is written.

54. The emulation apparatus of claim 42, wherein the access condition determining means has data storing means for storing a second data value, and detects that an address signal coincides with the access condition address designating a site from which the second data value is read or to which the second data value is written and that a data signal outputted to a data bus transmitting data coincides with the second data value.

* * * * *